(12) United States Patent
Choi et al.

(10) Patent No.: US 6,418,815 B1
(45) Date of Patent: Jul. 16, 2002

(54) APPARATUS FOR BALANCING ROTATING MEMBER

(75) Inventors: Hwan-young Choi; Jin-seung Choi, both of Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/055,308

(22) Filed: Apr. 6, 1998

(30) Foreign Application Priority Data

Jul. 8, 1997 (KR) ............................................. 97-31499
Jul. 9, 1997 (KR) ............................................. 97-31670

(51) Int. Cl.[7] ............................. F16F 15/10; F16F 15/22
(52) U.S. Cl. ..................................... 74/573 R; 74/574
(58) Field of Search ........................... 74/573 R, 573 F, 74/572, 574

(56) References Cited

U.S. PATENT DOCUMENTS 3,049,941 A * 8/1962 Rumsey ....................... 74/574
3,696,688 A * 10/1972 Goodrich et al. .......... 74/573 R
3,733,923 A * 5/1973 Goodrich et al. .......... 74/573 R

FOREIGN PATENT DOCUMENTS

| GB | 971962 | * 10/1964 | .................. 74/574 |
| GB | 971963 | * 10/1964 | .................. 74/574 |
| SU | 1195203 | * 11/1985 | ................ 74/573 R |
| SU | 1538069 | * 1/1990 | ................ 74/573 R |

* cited by examiner

Primary Examiner—Thomas R. Hannon
(74) Attorney, Agent, or Firm—Sughrue Mion, PLLC

(57) ABSTRACT

An appartatus for balancing a rotating member capable of preventing lubricity between balls from being reduced, and of enhancing balancing efficiency thereof. The rotational center of a turntable is the same as the center of the rotating member. A groove having a predetermined depth and a predetermined width is formed along the circumference of the turntable. A plurality of balls including first balls and second balls formed of different materials are alternately disposed in the groove. The first balls and the second balls may have different diameters.

9 Claims, 2 Drawing Sheets

APPARATUS FOR BALANCING ROTATING MEMBER

BACKGROUND OF THE INVENTION

1. Field of the Invention

The present invention relates to an apparatus for balancing a rotating member and, more particularly, to an apparatus for balancing a rotating member by preventing eccentricity generated due to inequality in the material, and unbalance in the shape, of the rotating member when the rotating member is rotated at a velocity that is lower than a critical rotational velocity thereof.

2. Description of the Related Art

As widely known, a balancing apparatus is provided to remove eccentricity generated due to inequality in the material, and unbalance in the shape, of a rotary shaft when the rotary shaft is rotated. The balancing apparatus includes a groove and a plurality of balls inserted in the groove. The groove is formed in the thickness, along the circumference of a turntable. The balls are inserted in the groove together with an operational fluid. When the rotary shaft is rotated at a velocity higher than a critical rotational velocity thereof, the balls and the operational fluid are automatically located at a position such that eccentricity due to inequality in the material, and unbalance in the shape, of the rotating member can be compensated.

FIG. 1 is a top view of a conventional balancing apparatus. As shown in FIG. 1, a groove 50 having a predetermined width and a predetermined depth is formed in the thickness along the circumference of a turntable 30. A plurality of balls 5 formed of a same material in a same shape and a same size are disposed in the groove 50. The balls 5 have a predetermined rigidity and can be used semi-permanently.

When the turntable 30 is rotated, the balls 5 are accordingly rotated at the same time. When the rotational velocity of the turntable 30 becomes higher than a predetermined velocity, the balls 5 are continuously rotated rubbing each other.

However, since the balls 5 are formed of the same material, frictional heat may occur between the balls 5 due to the affinity between the balls 5 when they are rotated. The frictional heat makes the balls 5 adhere to each other resulting in a reduced lubricity.

SUMMARY OF THE INVENTION

It is therefore an object of the present invention to provide an apparatus for balancing a rotating member, which is operative to prevent reduction of lubricity between balls disposed in a groove and enhance the balancing efficiency by forming the balls with different materials or by forming them in different sizes.

According to an aspect of the present invention, a groove having a predetermined depth and a predetermined width is formed in the thickness along the circumference of a turntable having a center that is the same as a rotational center of a rotating member, and first balls formed of a first material and second balls formed of a second material that is different from the first material are alternately disposed in the groove.

Preferably, the first balls may be formed of a nonmagnetic material and the second balls may be formed of a magnetic material or vice versa. Alternatively, all the first and the second balls may be formed of a nonmagnetic material.

The nonmagnetic material may be a beryllium copper alloy or bronze, and the magnetic material may be formed steel or stainless steel.

In addition, selectively, the first balls may be surface-treated by $MoS_2$, and the second balls may be surface-treated by diamond-like carbon, or vice versa.

Preferably, the sum of the number of first and second balls is an even number.

According to another aspect of the present invention, a groove having a predetermined depth and a predetermined width is formed in the thickness along the circumference of a turntable having a center that is the same as a rotational center of a rotating member, and first balls each having a first diameter and second balls each having a second diameter that is different from the first diameter are disposed. alternately in the groove.

Preferably, the shorter diameter of the first and the second diameters is in the range of from ⅓ to ½ of the longer diameter.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

The balancing apparatus according to the present invention will be hereinafter described in detail, referring to the accompanying drawings.

Figure 1:
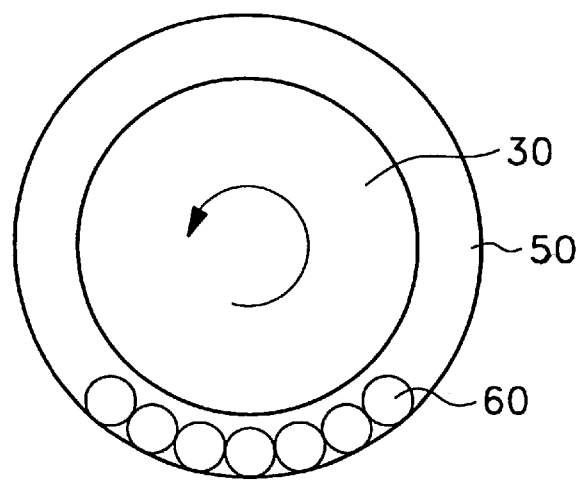
FIG. 1 is a top view of a conventional balancing apparatus.
Figure 2:
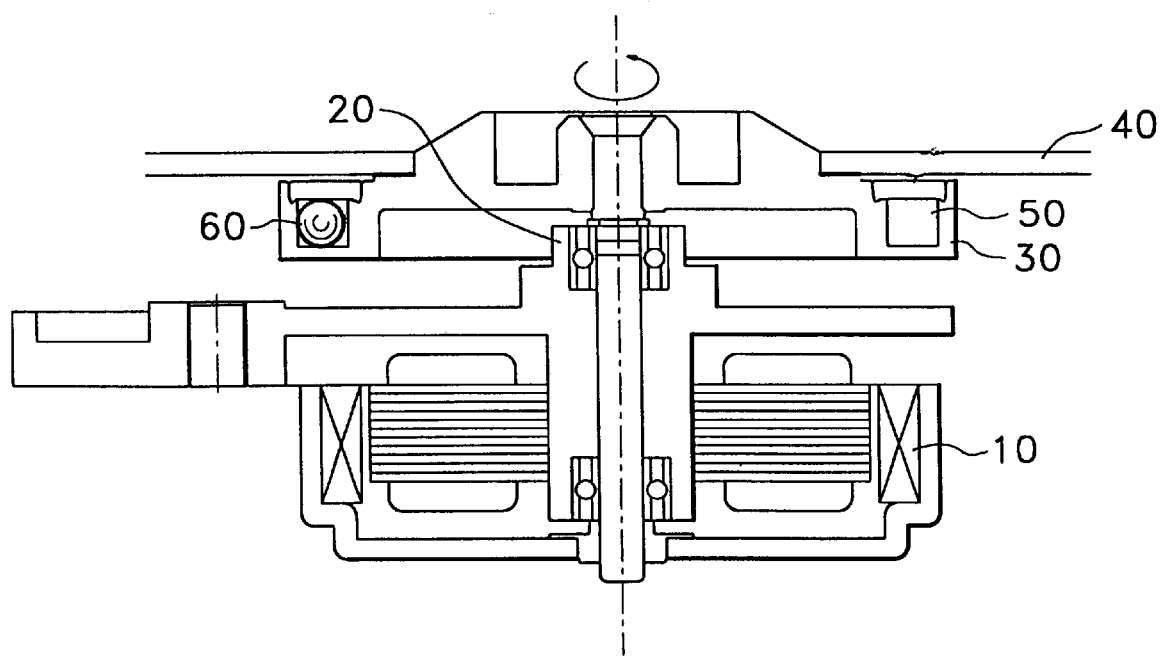
FIG. 2 is a cross sectional view of a CD-ROM drive to which a balancing apparatus according to the present invention is applied.

FIG. 2 is a cross sectional view of a CD-ROM drive to which a balancing apparatus according to the present invention is applied. The CD-ROM drive mainly includes: a motor 10 fixed to a housing; a turntable 30 fixed to a rotating member 20 of the motor 10 and rotated; and a disk 40 settled on the turntable 30 and rotated.

A balancing apparatus is included in the turntable 30. The balancing apparatus functions to balance the rotating member 20 when the rotating member is rotated with the disk 40 settled on the turntable 30. In other words, a groove 50 having a predetermined width and a predetermined depth is formed in the thickness along a circumference of the turntable 30. A plurality of balls 60 are disposed adjacent one another in the groove 50.

Figure 3:
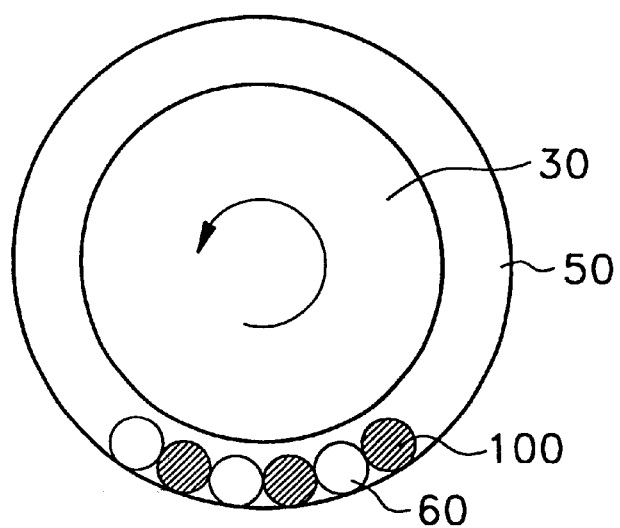
FIG. 3 is a top view of an embodiment of a balancing apparatus according to the present invention.

FIG. 3 is a top view of an embodiment of a balancing apparatus according to the present invention. As shown in FIG. 3, a plurality of first balls 60 and second balls 100 are disposed adjacent one another in the groove 50 formed in the thickness along the circumference of the turntable 30. The first and the second balls 60 and 100 are formed of different materials and are alternately disposed in the groove 50.

More particularly, the first balls 60 formed of a first material and the second balls 100 formed of a second material that is different from the first material are alternately disposed in the groove 50. At this time, it is important that none of the first and the second balls 60 and 100 are adjacent to a ball formed of the same material. That is none of the first balls 60 are adjacent one another, and none of the second balls 100 are adjacent one another.

Typically, the width of the groove 50 is not more than twice as long as the diameter of the balls 60 and 100, i.e., not more than two ball diameters. Accordingly, once the first and the second balls 60 and 100 are initially alternately inserted into the groove 50, the balls 60 and 100 cannot be out of turn.

There are two methods for forming the first and the second balls 60 and 100 of different materials.

First, a plurality of balls may be differently surface-treated so that the balls are divided into two groups: first balls 60; and second balls 100. For example, the first balls 60 may be surface-treated by $MoS_2$ (molybdenite) and the second balls 100 may be surface-treated by diamond-like carbon (DLC), or vise versa.

Second, a plurality of balls may be formed of two different materials so that the balls are divided into two groups: first balls 60; and second balls 100. For example, the first balls 60 may be formed of a nonmagnetic material such as beryllium copper alloy or bronze, and the second balls 100 may be formed of a magnetic material such as a chrome steel or a stainless steel. Generally, since nonmagnetic balls are costly, it is economical to use only magnetic balls formed of different materials. However, when the performance of the balancing apparatus is considered more important, nonmagnetic balls formed of different materials may be used.

As aforementioned, the first and the second balls 60 and 100 formed of different materials are alternately arranged in the groove 50. After the balls are first placed in groove 50, the sum of the number of first and second balls is an even number so that the balls at a first position and a last position are different from each other.

When power is supplied while the first and the second balls 60 and 100 are accommodated in the groove 50, the rotating member 20 is rotated and the turntable 30 is accordingly rotated. At the same time, the first and the second balls 60 and 100 are rotated to balance the turntable 30. Since the first and the second balls 60 and 100 are formed of different materials, the affinity between the balls is reduced as compared with the affinity between balls of a same material. Accordingly, heat from friction does not occur between the balls 60 and 100 and the lubricity is increased. As a result, the balancing efficiency of the balls is enhanced.

Figure 4:
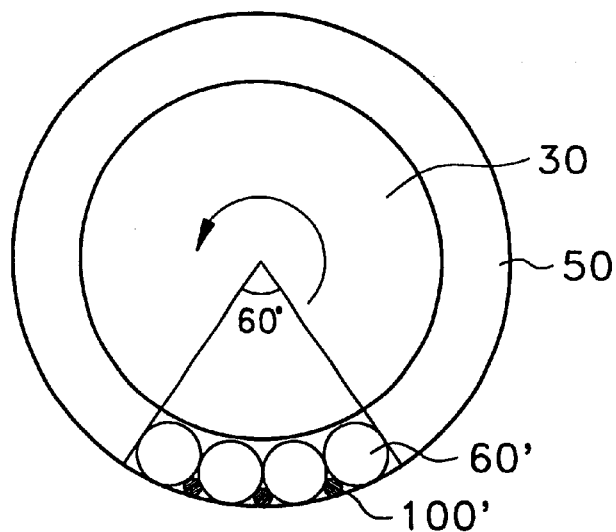
FIG. 4 is a top view of another embodiment of a balancing apparatus according to the present invention.

FIG. 4 is a top view of another embodiment of a balancing apparatus according to the present invention. As shown in FIG. 4, a plurality of first and second balls 60' and 100' are disposed in the groove 50 formed in the thickness along the circumference of the turntable 30. The first and the second balls 60' and 100' have different diameters to prevent a rotating member from being unbalanced when rotated.

More particularly, first balls 60' each have a first diameter and second balls 100' each have a second diameter such that the second diameter is shorter than the first diameter. The first balls 60' and the second balls 100' are alternately disposed in the groove 50. After the balls 60' and 100' are placed in groove 50, none of the first and the second balls 60' and 100' are adjacent to a ball formed of the same material. That is, none of the first balls 60' are adjacent one another, and none of the second balls 100' are adjacent one another in the series of balls.

The diameter of the turntable 30 is generally fixed. Accordingly, the number of the balls that can be disposed in the groove 50 is also fixed. On the other hand, the balancing efficiency depends on the number of the balls disposed in the groove 50. By the present invention, the number of the balls disposed in the groove 50 can be increased by inserting smaller balls into spaces between the originally disposed balls.

For example, if four first balls 60' having a predetermined diameter are disposed in a circumference spanning an angle of 60 degrees, three second balls 100' each having a diameter that is shorter than the first balls 60' can be respectively disposed in spaces between the first balls 60'. Thereby, the whole number of the balls disposed in the groove 50 is increased. As a result, the balancing efficiency of the balancing apparatus is enhanced. For practical use, each of the second balls 100' may have a diameter in the range 1/3 to 1/2 of the diameter of the first balls 60'.

When power is supplied with the first and the second balls 60' and 100' accommodated in the groove 50, the rotating member 20 is rotated and the turntable 30 is accordingly rotated. At the same time, the first and the second balls 60' and 100' are rotated to balance the turntable 30. At this time, the second balls 100' having a smaller diameter fill the spaces between the first balls 60'. Accordingly, the number of balls disposed in a unit angle of circumference is increased. As a result, the balancing efficiency of the balancing apparatus is enhanced.

The balancing apparatus according to the present invention, has been described above with reference to the aforementioned embodiments. It is evident, however, that many alternative modifications and variations will be apparent to those skilled in the art in light of the foregoing description. Accordingly, the invention embraces all such two alternative modifications and variations as fall within the spirit and scope of the appended claims.

What we claim is:

1. An apparatus for balancing a rotating member, comprising:
    a groove having a predetermined depth and width and formed in the thickness along a circumference of a turntable having a center equal to a rotational center of said rotating member; and
    a plurality of balls disposed in said groove, wherein said plurality of balls includes first balls formed of a first material and second balls formed of a second material that is different from said first material, wherein said first and said second balls are alternately disposed in said groove, and further wherein said first and said second balls are formed of a nonmagnetic material.

2. The apparatus for balancing a rotating member according to claim 1 wherein said nonmagnetic material is beryllium copper alloy.

3. The apparatus for balancing a rotating member according to claim 1, wherein said nonmagnetic material is bronze.

4. An apparatus for balancing a rotating member according, comprising:
    a groove having a predetermined depth and width and formed in the thickness along a circumference of a turntable having a center equal to a rotational center of said rotating member; and
    a plurality of balls disposed in said groove, wherein said plurality of balls includes first balls formed of a first material and second balls formed of a second material that is different from said first material, wherein said first and said second balls are alternately disposed in said groove, wherein said first balls are formed of a nonmagnetic material and said second balls are formed of a magnetic material, and further wherein said nonmagnetic material is beryllium copper alloy.

5. An apparatus for balancing a rotating member, comprising:
- a groove having a predetermined depth and width and formed in the thickness along a circumference of a turntable having a center equal to a rotational center of said rotating member; and
- a plurality of balls disposed in said groove, wherein said plurality of balls includes first balls formed of a first material and second balls formed of a second material that is different from said first material, wherein said first and said second balls are alternately disposed in said groove, wherein said first balls are formed of a nonmagnetic material and said second balls are formed of a magnetic material, and further wherein said nonmagnetic material is bronze.

6. An apparatus for balancing a rotating member, comprising:
- a groove having a predetermined depth and width and formed in the thickness along a circumference of a turntable having a center equal to a rotational center of said rotating member; and
- a plurality of balls disposed in said groove, wherein said plurality of balls includes first balls formed of a first material and second balls formed of a second material that is different from said first material, wherein said first and said second balls are alternately disposed in said groove, wherein said first balls are formed of a nonmagnetic material and said second balls are formed of a magnetic material, and further wherein said magnetic material is chrome steel.

7. An apparatus for balancing a rotating member, comprising:
- a groove having a predetermined depth and width and formed in the thickness along a circumference of a turntable having a center equal to a rotational center of said rotating member; and
- a plurality of balls disposed in said groove, wherein said plurality of balls includes first balls formed of a first material and second balls formed of a second material that is different from said first material, wherein said first and said second balls are alternately disposed in said groove, wherein said first balls are formed of a nonmagnetic material and said second balls are formed of a magnetic material, and further wherein said magnetic material is stainless steel.

8. An apparatus for balancing a rotating member, comprising:
- a groove having a predetermined depth and width and formed in the thickness along a circumference of a turntable having a center equal to a rotational center of said rotating member; and
- a plurality of balls disposed in said groove, wherein said plurality of balls includes first balls formed of a first material and second balls formed of a second material that is different from said first material, wherein said first and said second balls are alternately disposed in said groove, and further wherein said first balls are surface-treated by molybdenite and said second balls are surface-treated by diamond-like carbon.

9. An apparatus for balancing a rotating member, comprising:
- a groove having a predetermined depth and width and formed in the thickness along a circumference of a turntable having a center equal to a rotational center of said rotating member; and
- a plurality of balls disposed in said groove, wherein said plurality of balls are divided into first balls each having a first diameter and second balls each having a second diameter that is different from said first diameter, wherein said first and said second balls are disposed alternating in said groove, and further wherein the shorter diameter of said first and said second diameters is in a range of from $\frac{1}{3}$ to $\frac{1}{2}$ of the longer diameter.

* * * * *

UNITED STATES PATENT AND TRADEMARK OFFICE
CERTIFICATE OF CORRECTION

PATENT NO. : 6,418,815 B1
APPLICATION NO. : 09/055308
DATED : July 16, 2002
INVENTOR(S) : Choi et al.

It is certified that error appears in the above-identified patent and that said Letters Patent is hereby corrected as shown below:

On the title page,
Item [*] delete "0" and insert --176--.

Signed and Sealed this

Fifth Day of December, 2006

JON W. DUDAS
*Director of the United States Patent and Trademark Office*